US008825057B2

(12) United States Patent
Lekutai

(10) Patent No.: US 8,825,057 B2
(45) Date of Patent: Sep. 2, 2014

(54) RANGE EXPANSION IN A WIRELESS NETWORK ENVIRONMENT

(75) Inventor: Gaviphat Lekutai, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 223 days.

(21) Appl. No.: 13/309,182

(22) Filed: Dec. 1, 2011

(65) Prior Publication Data

US 2013/0143578 A1 Jun. 6, 2013

(51) Int. Cl.
*H04W 72/00* (2009.01)

(52) U.S. Cl.
USPC ........... 455/444; 455/436; 455/522; 370/330; 370/252

(58) Field of Classification Search
USPC ........ 455/436, 561, 278.1, 277.1, 452.1, 451, 455/562.1, 444, 522; 700/53; 370/330, 335, 370/394, 252, 329, 331; 375/130, 240.01
See application file for complete search history.

(56) References Cited

U.S. PATENT DOCUMENTS

| 8,432,870 | B2 * | 4/2013 | Maheshwari et al. ........ 370/331 |
| 2002/0102976 | A1 * | 8/2002 | Newbury et al. .............. 455/436 |
| 2003/0185309 | A1 * | 10/2003 | Pautler et al. ................. 375/257 |
| 2004/0009749 | A1 * | 1/2004 | Arazi et al. ................... 455/41.2 |
| 2005/0007982 | A1 * | 1/2005 | Miyoshi ........................ 370/334 |
| 2005/0083888 | A1 * | 4/2005 | Smee et al. .................... 370/332 |
| 2005/0181831 | A1 * | 8/2005 | Doi ............................. 455/562.1 |
| 2008/0008130 | A1 * | 1/2008 | Haga et al. .................... 370/331 |
| 2009/0074099 | A1 | 3/2009 | Zheng et al. |
| 2010/0273487 | A1 * | 10/2010 | Alonso-Rubio et al. ...... 455/436 |
| 2010/0323745 | A1 | 12/2010 | Chen et al. |
| 2011/0194527 | A1 | 8/2011 | Lin et al. |
| 2011/0206112 | A1 * | 8/2011 | Feher ........................ 375/240.01 |
| 2013/0051256 | A1 * | 2/2013 | Ong et al. ..................... 370/252 |

OTHER PUBLICATIONS

Salo, et al. "Practical Introduction to LTE for Radio Planners", Feb. 23, 2010, published online at [www.eceltd.com/lte_rf_wp_2010Feb23.pdf], retrieved on Dec. 1, 2011. 13 pages.
Pauli, et al. "Heterogeneous LTE Networks and Inter-Cell Interference Coordination", Nomor Research GmbH, Munich, Germany, Dec. 2010, 9 pages.

* cited by examiner

*Primary Examiner* — Mahendra Patel
(74) *Attorney, Agent, or Firm* — Amin, Turocy & Watson, LLP

(57) ABSTRACT

Aspects relate to modifications to one or more handover parameters such that spectrum efficiency and user performance can be increased by retaining a mobile device in a source cell, having a more desirable multiple-input multiple-output capability, longer before handover to a cell having a less desirable (or non-) multiple-input multiple-output capability (e.g., slower handover). Another aspect relates to modifying one or more handover parameters such that the mobile device is handed over from a source cell to a target cell quicker if the target cell has better multiple-input multiple-output performance than the source cell. The source cell and/or target cell can be macro cells and/or small cells. For example, the mobile device can hand over from a macro cell to a small cell and/or from a small cell to a macro cell. Further, the disclosed aspects can be implemented on the network and/or the mobile device.

20 Claims, 14 Drawing Sheets

RANGE EXPANSION IN A WIRELESS NETWORK ENVIRONMENT

TECHNICAL FIELD

The subject disclosure relates to wireless communications and, more particularly, to expanding a range of mobile equipment in a wireless network environment.

BACKGROUND

With increasingly high demand for mobile services, wireless communications networks are being deployed that utilize both macro cells and small cells. For example, small cells (e.g., pico cells, metro cells, micro cells, femtocells, and so forth) are becoming prevalent in macro networks (e.g., Third Generation (3G), Fourth Generation (4G), and so forth) to offload traffic and increase coverage and capacity. Macro cells can cover a large geographic area and can provide unrestricted (or restricted) access to user equipment (UE) that has service subscriptions with the network provider. Pico cells can cover a smaller geographic area and can allow unrestricted access by UEs that have service subscriptions with the network provider. A femtocell can cover a small geographic area, such as a home, and can provide restricted access by UEs that have an association with the femtocell (such as for UEs associated with people that reside in the house or visit the house) and/or might provide unrestricted access.

When a layer of planned high power macro cells, overlaid with layers of lower-power small cells, is planned properly, it can improve the overall capacity and cell-edge performance. Such a network is referred to as a heterogeneous network or HetNet, which is a Long-Term Evolution (LTE) phase 2 deployment and can be utilized to offload coverage holes and hotspots of the LTE macro network.

SUMMARY

A simplified summary is provided herein to help enable a basic or general understanding of various aspects of example, non-limiting embodiments that follow in the more detailed description and the accompanying drawings. This summary is not intended, however, as an extensive or exhaustive overview. Instead, the sole purpose of this summary is to present some concepts related to some example, non-limiting embodiments in a simplified form as a prelude to the more detailed description of the various embodiments that follow. It will also be appreciated that the detailed description may include additional or alternative embodiments beyond those described in this summary.

In an example embodiment, an aspect relates to a system comprising a multiple-input multiple-output availability identification component configured to determine a first multiple-input multiple-output transmission scheme of a first cell and a second multiple-input multiple-output transmission scheme of a second cell. The system also includes a handover adjustment component configured to modify a handover timing parameter as a function of the first multiple-input multiple-output transmission scheme and the second multiple-input multiple-output transmission scheme.

Another aspect relates to a method comprising ascertaining, by a system comprising at least one processor, a source cell multiple-input multiple-output transmission scheme and a target cell multiple-input multiple-output transmission scheme in response to determining a mobile device is to be handed over from a source cell to a target cell. The method also comprises comparing, by the system respective MIMO performances of the source cell multiple-input multiple-output transmission scheme and the target cell multiple-input multiple-output transmission scheme. Further, the method comprises adjusting, by the system, a handover parameter as a function of the comparing. The mobile device is handed over, by the system, from the source cell to the target cell based on the adjusted handover parameter.

Yet another aspect relates to a computer-readable storage medium comprising computer-executable instructions stored therein that, in response to execution, cause a computing system to perform operations. The operations comprise associating a first multiple-input multiple-output transmission scheme with a source cell and a second multiple-input multiple-output transmission scheme with a target cell. The operations also comprise adjusting a handover timing parameter as a function of the first multiple-input multiple-output transmission scheme and the second multiple-input multiple-output transmission scheme.

These and other aspects or embodiments are described in more detail below.

BRIEF DESCRIPTION OF THE DRAWINGS

Various non-limiting embodiments are further described with reference to the accompanying drawings in which.

DETAILED DESCRIPTION

Figure 1:
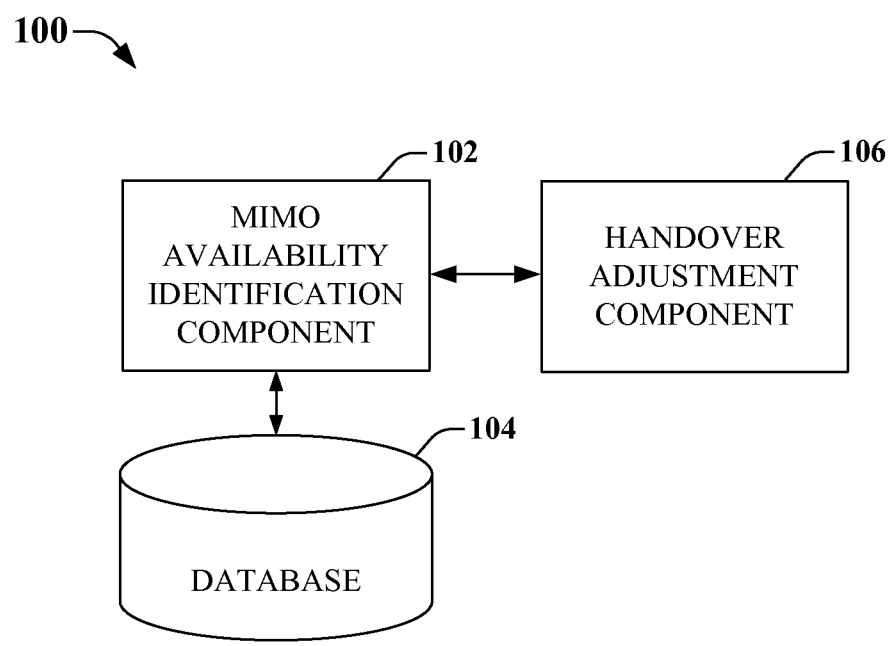
FIG. 1 illustrates an example, non-limiting system configured to provide more efficient mobility handovers between macro cells and small cells, according to an aspect.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Various embodiments can be configured to improve the spectrum efficiency of HetNet deployments by added granularity to handover thresholds. According to an aspect, multiple-input multiple-output (MIMO) availability can be utilized to facilitate timing of handover from a macro cell to a small cell and/or from a small cell to a macro cell. In accordance with some aspects, implementation of additional thresholds for range expansion from macro cells to small cells can be based on macro cell MIMO availability and/or additional macro cell inter-cell interference coordination (ICIC) partitions involving true MIMO availability. In a similar manner, other aspects relate to implementation of additional thresholds for range expansion from small cells to macro cells, which can be based on small cell MIMO availability and/or additional small cell ICIC partitions involving true MIMO availability.

An aspect can relate to a system comprising a MIMO availability identification component configured to determine a first MIMO transmission scheme of a first cell and a second MIMO transmission scheme of a second cell. The system also includes a handover adjustment component configured to modify a handover timing parameter as a function of the first MIMO transmission scheme and the second MIMO transmission scheme.

In an example implementation, the handover adjustment component can be configured to lengthen the handover timing parameter in response to the first MIMO transmission scheme having a better MIMO performance than the second MIMO transmission scheme. In another implementation, the handover adjustment component can be configured to shorten the handover timing parameter in response to the second MIMO transmission scheme having a better performance than the first MIMO transmission scheme.

In some implementations, the first MIMO transmission scheme is one of combined transmit/receive diversity, beamforming, or spatial multiplexing. Similarly, the second MIMO transmission scheme is one of combined transmit/receive diversity, beamforming, or spatial multiplexing.

In an example implementation, the MIMO availability identification component can be further configured to identify a non-MIMO transmission scheme. Further to this implementation, the handover adjustment component can be configured to change a handover parameter wherein handover to the second cell occurs faster in response to the first cell being identified with the non-MIMO transmission scheme.

In another example implementation, the MIMO availability identification component can be further configured to identify a non-MIMO transmission scheme. Further to this implementation, the handover adjustment component can be configured to change a handover parameter wherein handover to the second cell occurs slower in response to the second cell being identified with the non-MIMO transmission scheme.

In some aspects, the first MIMO transmission scheme and the second MIMO transmission scheme can have a same MIMO performance and the handover adjustment component can be configured to utilize an existing or standard handover timing parameter. In accordance with a further aspect, the first cell and the second cell utilize a same frequency partitioning or a different frequency spectrum. According to yet another aspect, the first cell is a macro cell and the second cell is a small cell. In a further aspect, the first cell is a small cell and the second cell is a macro cell. According to some aspects, the first cell and second cell are macro cells. In still a further aspect, the first cell and second cell are small cells.

Another aspect can relate to a method comprising ascertaining, by a system comprising at least one processor, a source cell MIMO transmission scheme and a target cell MIMO transmission scheme in response to determining a mobile device is to be handed over from a source cell to a target cell. The method can also include comparing, by the system, respective MIMO performances of the source cell MIMO transmission scheme and the target cell MIMO transmission scheme. Further, the method includes adjusting, by the system, a handover parameter as a function of the comparing. The mobile device is handed over, by the system from the source cell to the target cell based on the adjusted handover parameter.

In an implementation, adjusting the handover parameter can comprise shortening a time to hand over the mobile device from the source cell to the target cell as compared to a uniform handover boundary being used for the handover. In another implementation, adjusting the handover parameter can comprise delaying a handover of the mobile device from the source cell to the target cell as compared to a uniform handover boundary being used for the handover.

In some implementations, comparing respective MIMO performances can comprise determining that the target cell MIMO transmission scheme has a better MIMO performance than the source cell MIMO transmission scheme and the adjusting can comprise causing the mobile device to handover from the source cell to the target cell almost instantaneously (or as soon as possible). In other implementations, comparing respective MIMO performances can comprise determining that the source cell MIMO transmission scheme has a better MIMO performance than the target cell MIMO transmission scheme and the adjusting can comprise retaining the mobile device on the source cell longer than a uniform handover boundary.

In an example implementation, ascertaining the transmission schemes can comprise determining the source cell MIMO transmission scheme is one of combined transmit/receive diversity, beamforming, or spatial multiplexing and the target cell MIMO transmission scheme is one of combined transmit/receive diversity, beamforming, or spatial multiplexing.

Yet another aspect relates to a computer-readable storage medium comprising computer-executable instructions stored therein that, in response to execution, cause a computing system to perform operations. The operations can comprise associating a first MIMO transmission scheme with a source cell and a second MIMO transmission scheme with a target cell. The operations can also comprise adjusting a handover timing parameter as a function of the first MIMO transmission scheme and the second MIMO transmission scheme.

In an example implementation, the operations can further comprise comparing respective MIMO performances of the first MIMO transmission scheme and the second MIMO transmission scheme. Further to this implementation, the adjusting can be based on a difference between a MIMO performance of the first MIMO transmission scheme and the MIMO performance of the second MIMO transmission scheme. In some implementations, the operations can further comprise lengthening the handover timing parameter in response to the first MIMO transmission scheme having a better performance than the second MIMO transmission scheme. In still another implementation, the operations can further comprise shortening the handover timing parameter in response to the second MIMO transmission scheme having a better performance than the first MIMO transmission scheme.

Although various aspects and embodiments are discussed herein with respect to Long-Term Evolution (LTE), the subject disclosure is not limited to an LTE implementation. For example, aspects or features of the disclosed aspects can be exploited in substantially any wireless communication technology; e.g., Universal Mobile Telecommunications System (UMTS), Code Division Multiple Access (CDMA), Wi-Fi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Referring initially to FIG. 1, illustrated is an example, non-limiting system 100 configured to provide more efficient mobility handovers between macro cells and small cells, according to an aspect. System 100 can be implemented in a network (e.g., base station) and/or a mobile device (e.g., user equipment (UE)). As utilized herein, a UE can include a LTE-based electronic device, such as, but not limited to, a cell phone, a PDA (personal digital assistant), a media player, a digital camera, a media recorder, a laptop, a personal computer, a printer, a scanner, a tablet, a GPS module, a gaming module, and so forth. Further, the UE can also include LTE-based appliances that can be employed, for example, in a home, office, building, retail store, restaurant, hotel, factory, warehouse, and so on. It can be appreciated that the UE can be mobile (e.g., cellular phone) and/or have limited mobility (e.g., desktop computer). As previously noted, it should be appreciated that although the various aspects are discussed herein with reference to LTE, the aspects are not limited to an LTE implementation. Instead, the various aspects can be utilized with other network technologies and LTE technology is utilized herein for purposes of simplicity.

According to an aspect, system 100 can be configured to modify one or more handover parameters such that spectrum efficiency and/or user performance can be increased and/or improved by implementing a slower handover and/or a faster handover as a function of MIMO availability. For example, according to various deployments, a uniform handover threshold among the macro cells and small cells are proposed from chunks of hard frequency reuse spectrum. For example, LTE release 8/9 employs ICIC methods among the macro cells using a hybrid frequency partitioning. There are four types of frequency partitioning: (1) full frequency reuse, (2) hard frequency reuse, (3) fractional frequency reuse, and (4) soft frequency reuse. In full frequency reuse, all cell sites transmit uniform power over the entire system bandwidth. In hard frequency reuse, frequency distribution is applied by dividing in groups of 3, 4, or 7 (similar to GSM) such that neighboring cells do not use the same set of frequencies, thus hard frequency reuse can reduce interference at the cell edge but at the expense of reduced spectrum efficiency. Fractional frequency reuse is a hybrid between full frequency reuse and hard frequency reuse. One chunk of spectrum is assigned a full frequency reuse to center-cell UEs and the other chunks are assigned to the cell-edge UEs. Fractional frequency reuse is used for ICIC in the uplink. Soft frequency reuse is similar to full frequency reuse but uses a non-uniform power spectrum, which can be used for ICIC in the downlink.

In order for the HetNet to work effectively, the load balancing between macro and small cells can be achieved by biasing handover decisions between the different macro cells such that UEs are handed over to small cells earlier than usual, which is referred to as "range expansion". Thus, the disclosed example aspects, including system 100, can be configured to modify one or more handover parameters based on the availability of a cell having MIMO capability, wherein the handover of the UE to the small cells is delayed if the small cell does not provide MIMO capability (but the cell from which the UE is being handed over does provide MIMO capability). Retaining a mobile device in a source cell, which has MIMO capability, longer (e.g., slower handover) can facilitate more efficient mobility handovers. Another aspect relates to modifying one or more handover parameters such that the mobile device is handed over from a source cell to a target cell quicker if the source cell does not have MIMO capability, but the target cell has MIMO capability. The source cell and/or target cell can be macro cells and/or small cells. For example, the mobile device can hand over from a macro cell to a small cell and/or from a small cell to a macro cell. In accordance with some aspects, the mobile device can be handed over between macro cells and/or between small cells. Further, the disclosed aspects can be implemented on the network and/or on the mobile device.

To facilitate such modifications to the one or more handover parameters, according to an embodiment, system 100 can include a Multi-Input, Multi-Output (MIMO) availability identification component 102 that can be configured to determine whether a neighboring cell (or target cell) has MIMO availability. The MIMO availability identification component 102 can be also configured to ascertain the MIMO availability of a current cell (or source cell). The MIMO availability identification component 102 can ascertain the MIMO availability of the cells at a similar time or at different times. For example, the determination might be made by MIMO availability identification component 102 when it is indicated that the mobile device should hand over to the target cell. In accordance with some aspects, the MIMO availability of the source cell might be determined at about the same time as the mobile device enters the geographic area of the source cell (e.g., upon power-up, upon handover to the source cell, and so forth).

For example, in LTE the UEs can utilize two receive antennas while the number of base station antennas can be 1, 2, or 4 (e.g., 1 transmit antenna×two receive antennas, 1×2, 2×2, or 4×2). There are a number of ways to utilize MIMO transmission schemes, such as, for example, combined transmit/receive diversity, beamforming, and spatial multiplexing. The choice of the MIMO can depend on instantaneous radio channel conditions. For example, an SINR less than a threshold, for example 10 dB (SINR>10 db), can be suitable for the Rank-2 scheme, according to an example embodiment.

Combined transmit/receive diversity can include two branch diversity reception or transmission, which produces two copies of the same signal for reception, which can reduce fading variation. In a similar manner, a 2 transmit×2 receive antenna transmission results in four signal replicas with a corresponding additional reduction in fading. Combined transmit/receive diversity can be considered an enhanced diversity or Rank-1 diversity, but might not be considered a true MIMO since combined transmit/receive diversity does not increase transmission data rate.

Beamforming is similar to transmit/receive diversity, but with a physical antenna beam tailored toward the UE. Thus, for beamforming closely spaced antennas are utilized, which is different from diversity schemes where at least a few wavelength antenna spacing is used. To implement beamforming, the UE provides CQI (Channel Quality Indicator) feedback and a pre-defined 3GPP codebook is utilized. Beamforming is considered a Rank-1 precoding, not a true MIMO.

With diversity and beamforming, the base station can transmit a single stream of information, but uses the multiple antennas to either reduce fading (diversity) or increase signal power (beamforming). With a 2 transmit and 2 receive spatial multiplexing scheme, for example, two parallel information streams can be transmitted over the same bandwidth, which can increase the speed performance by two times (e.g., double the data rate and spectral efficiency) over 1×2 due to transmitting two parallel information streams over the same bandwidth. Spatial multiplexing can be considered a true MIMO or Rank 2 transmission scheme.

In accordance with some aspects, the MIMO availability identification component 102 can be configured to determine the type of MIMO transmission scheme for a source cell and/or a target cell. For example, MIMO availability identification component 102 can be configured to determine if the source cell and/or target cell is a Rank-1 MIMO, a Rank-2 MIMO, or a non-MIMO cell. In an implementation where system 100 is included on the mobile device, the mobile device can utilize the measurements made by mobile device to make the MIMO determination. In an example implementation where system 100 is included in the network (e.g., base station), the network can receive measurements from the mobile device and make the determination on behalf of the mobile device.

In accordance with some aspects, the information related to the type of cell can be stored within a database 104. For example, a table that contains an identification of the cell (e.g., base station identification code), the type of cell (e.g., macro cell, micro cell, and so on), and the type of MIMO transmission scheme (e.g., Rank-1 MIMO, Rank-2 MIMO, non-MIMO, and so forth) can be retained in a database 104. The database 104 can be retained locally (e.g., within the mobile device, within the network) and/or can be retained remotely, wherein the mobile device and/or network accesses an external database for the information. Retaining such information locally can be useful in situations where a handover to a target cell may be expected, but measurements cannot be received from the network (or from the mobile device) in a timely manner (e.g., the device is in a urban canyon or due to other communication problems). Thus, the internal or external database can be consulted and a determination can be made as to the expected capabilities of the target cell. If, after measurements are taken the information retained in the internal/external database is incorrect, the updated information can be stored in the database 104 for future retrieval.

It can be appreciated that the database 104 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases, and so on) of the subject systems and methods is intended to comprise, without being limited to, these and any other suitable types of memory. Further, although the subject specification describes LTE macro and femtocells, it can be appreciated that the disclosed aspects are not so limited and that co-channel macro and femtocells deployed in most any communication network can be utilized.

Also included in system 100 can be a handover adjustment component 106 configured to modify one or more handover parameters. The modifications can be made to a default or standard handover timing parameter, according to an aspect. However, according to other aspects, the modifications can be made to a customized and/or configurable handover timing parameter.

For example, if the source cell provides Rank-2 capability and the target cell provides Rank-1 capability, the handover adjustment component 106 can be configured to delay the handover to the target cell because the source cell has better MIMO performance than the target cell. In another example, if the source cell provides Rank-1 capability and the target cell provides Rank-2 capability, the handover adjustment component 106 can be configured to accelerate the handover to the target cell, since the target cell provides a better performing MIMO transmission scheme than the source cell.

The rankings orders as utilized herein can be arbitrary. For example, the rankings as discussed herein are with reference to a Rank-2 having a better MIMO performance than a Rank-1 (or a Rank-0). However, the aspects are not limited to this ranking order. Instead, according to alternative aspects, a Rank-1 (or Rank-0) could be utilized to denote a best (or better) MIMO performance. In another alternative aspect, a Rank-2 (or different ranking) can be utilized to designate a non-MIMO transmission scheme. Further, means other than employing a ranking order can be utilized for identifying better MIMO performance and the ranking orders discussed herein are for purposes of simplicity.

In a further example, if the source cell and the target cell have similar capabilities (e.g., both cells are Rank-2, both cells are Rank-1, both cell are non-MIMO cells, and so forth), the handover adjustment component 106 can be configured to utilize an existing or standard handover procedure, such as to handover to a microcell as fast as possible. In some situations, it might be beneficial to utilize a microcell rather than a macro cell. As an example, femtocells can provide authorized customers with various benefits, such as but not limited to, lower billing rates, improved coverage, unlimited calling plans, femto services, and so forth. Thus, it might be more beneficial for an authorized customer to camp on a femtocell as soon as the device enters the femtocell coverage area, and stay connected to the femtocell as long as coverage from the femtocell permits. Thus, such aspects can be considered by handover adjustment component 106 and implemented according to various criteria (e.g., network parameters or preferences, user preferences, the type of communication being transmitted, the capabilities of the mobile device, and so forth).

Thus, in a further example, the handover adjustment component 106 can be configured to allow the mobile device to hand over faster from a micro cell (e.g., femtocell or small cell) to a macro cell (e.g., LTE services) if the micro cell and macro cell provide similar capabilities (e.g., both cells are Rank-2, both cells are Rank-1, and so forth). In accordance with some aspects, a cell that does not have MIMO capability (e.g., non-MIMO) can be associated with a zero rank or Rank-0, according to an aspect.

Figure 2:
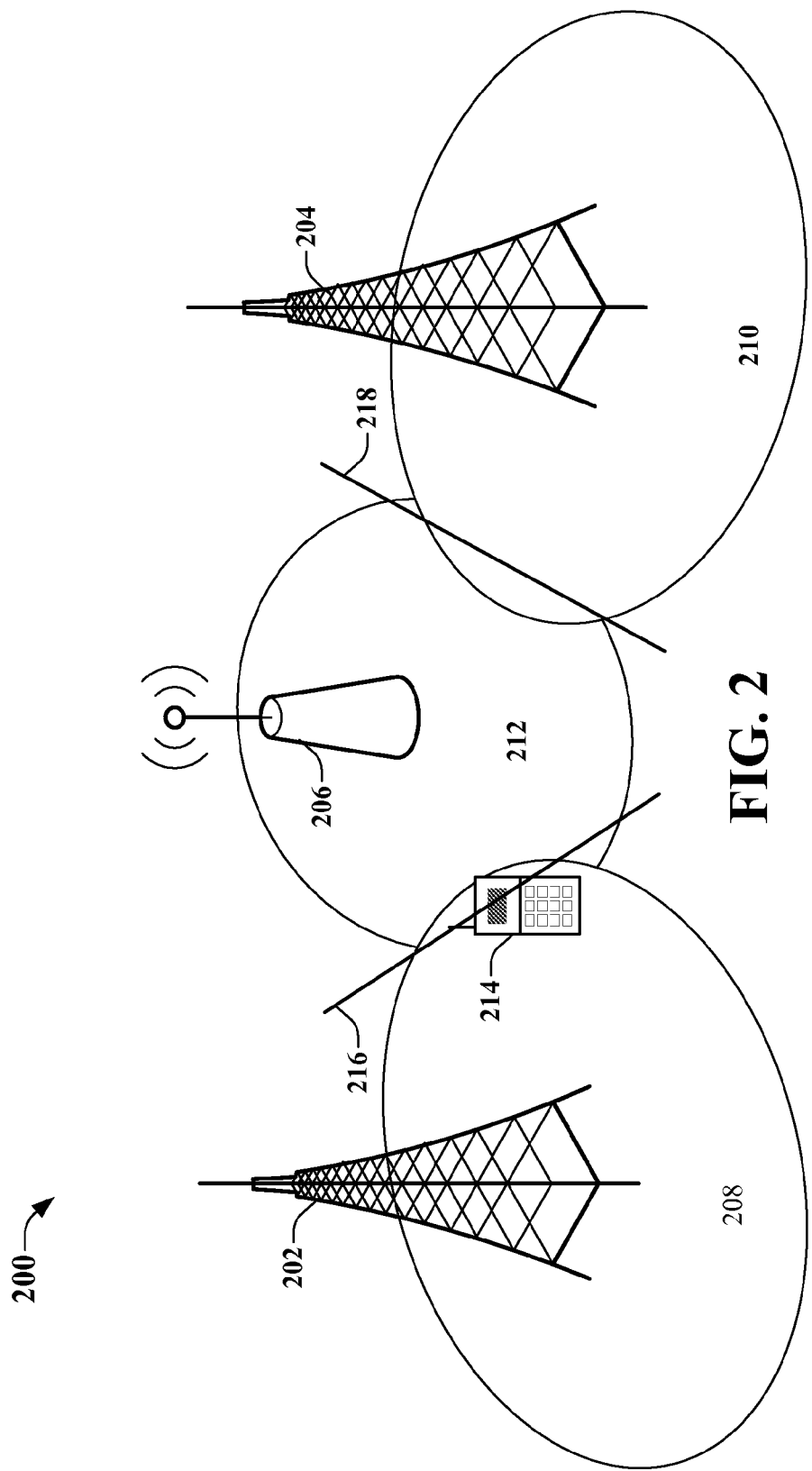
FIG. 2 illustrates an example non-limiting wireless network environment that utilizes a standard handover procedure.

FIG. 2 illustrates an example non-limiting wireless network environment 200 that utilizes a standard handover procedure. For example, the example wireless network environment 200 can utilize uplink inter-cell interference coordination, for example as employed by LTE Rel 8/9. The example wireless network environment 200 utilizes macro load balancing (HetNet) to small cell, such as a pico cell, with range expansion (e.g., handing over to small cell sooner). Full frequency reuse can be utilized at the center of the cell and hard frequency reuse can be utilized at the cell edge.

Illustrated in the wireless network environment 200 are a first macro cell 202, a second macro cell 204, and a small cell 206. As illustrated, each cell has a geographic area 208, 210, 212. Also illustrated is a mobile device 214. The uniform HetNet handover boundaries are illustrated by lines 216 and 218. As illustrated, the mobile device 214 is handed over from the first macro cell 202 to the small cell 206, at 216. Further, the mobile device 214 is handed over from the small cell 206 to the second macro cell 204, at 218. These uniform handover boundaries are utilized regardless of the type of MIMO schemes utilized by the macro cells and/or small cell.

Figure 3:
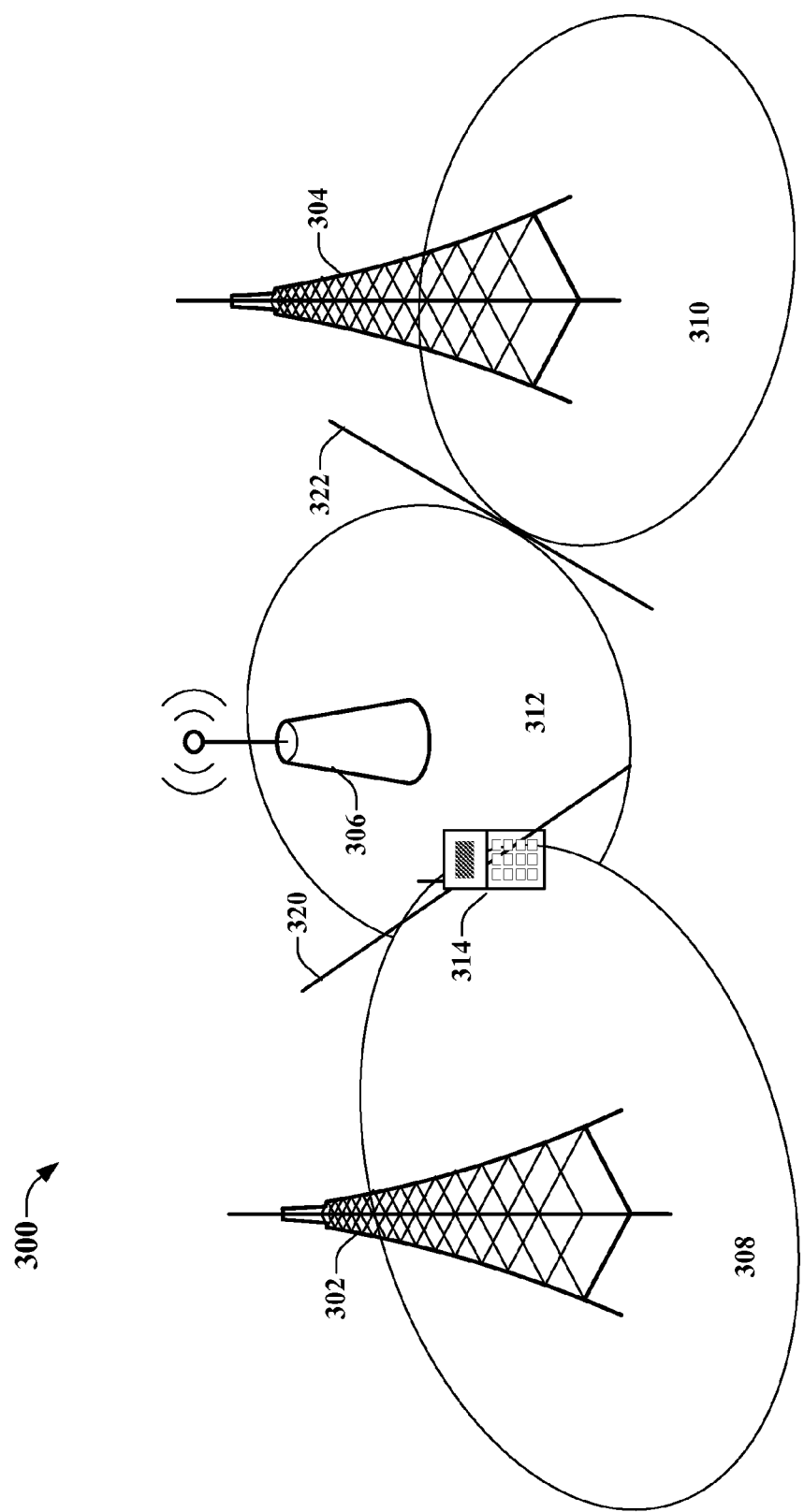
FIG. 3 illustrates an example non-limiting wireless network environment that utilizes macro load balancing by differentiating MIMO performance, according to an aspect.

FIG. 3 illustrates an example non-limiting wireless network environment 300 that utilizes macro load balancing (HetNet) by differentiating MIMO performance, according to an aspect. The example wireless network environment 300 utilizes granular HetNet handover. Similar to the above figure, illustrated are a first macro cell 302, a second macro cell 304 and a small cell 306. As illustrated, each cell has a corresponding geographic area 308, 310, 312. Also illustrated is a mobile device 314.

For this example wireless network environment 300, the first macro cell 302 is a macro MIMO that has Rank 2 (or true MIMO) capability and the second macro cell 304 is a macro MIMO that has Rank 1 capability. In this situation, the handover parameters can be modified such that the mobile device 314 stays in macro rank 2 (e.g., first macro cell 302) longer, as indicated by line 320, as compared to a uniform handover boundary. Thus, for example, if the mobile device is handing over from the first macro cell 302 to the small cell 306, the handover parameters are modified to delay the handover. Further to this example, if the mobile device 314 is handing over from the small cell 306 to the second micro cell 304, the handover parameters are modified such that the handover occurs as slow as possible, as indicated by line 322.

Figure 4:
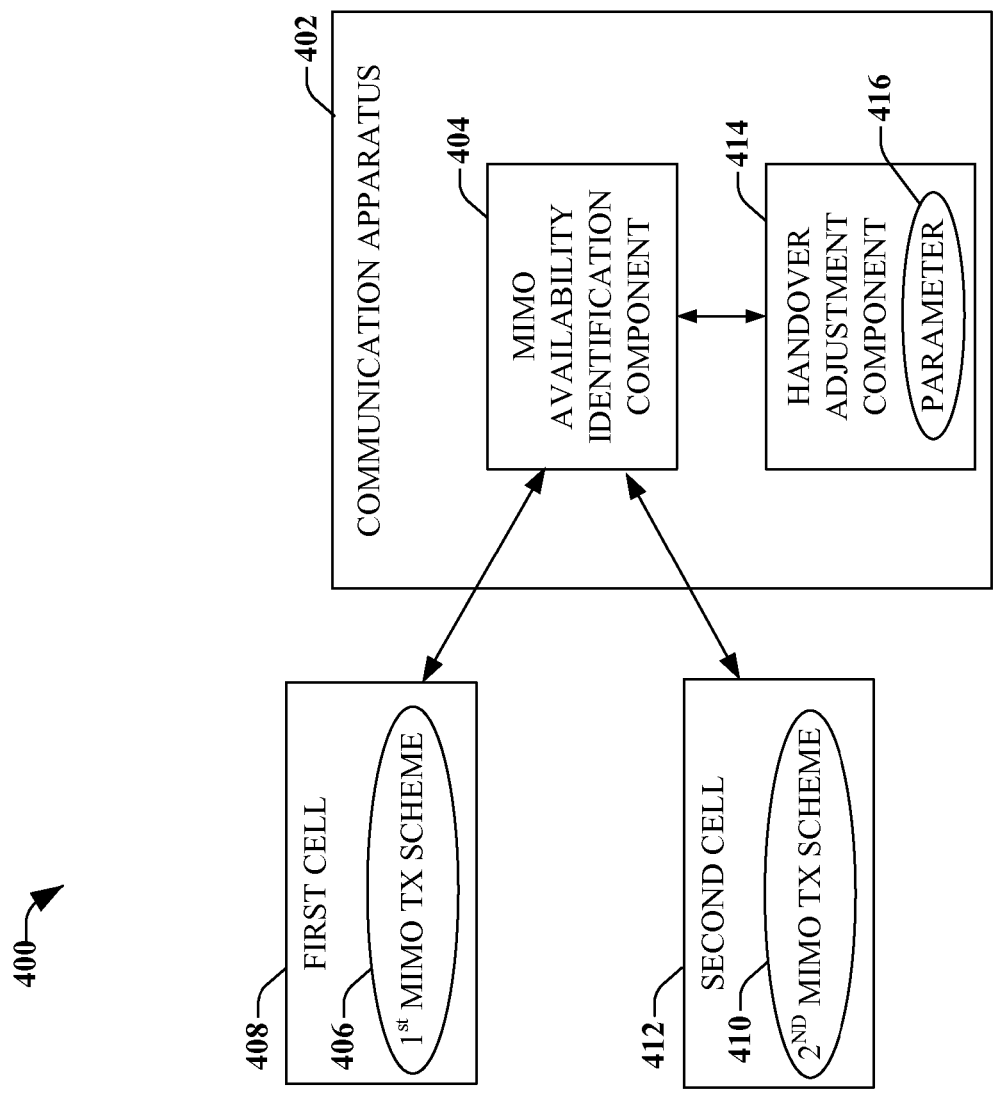
FIG. 4 illustrates an example, non-limiting implementation of range expansion in a wireless network environment, according to an aspect.

FIG. 4 illustrates an example, non-limiting implementation of range expansion in a wireless network environment 400, according to an aspect. The wireless network environment 400 can be configured to implement thresholds (or additional thresholds) for range expansion from macro cells to small cells (or from small cells to macro cells) based on MIMO availability and/or additional macro ICIC partitions involving true MIMO availability. The thresholds can be applied in a granular manner such that the spectrum efficiency of HetNet deployments can be improved. In accordance with some aspects, the various aspects disclosed herein can be implemented in the radio access network (RAN), such as in the evolved NodeB (eNB). However, according to some implementations, the disclosed aspects can be implemented on the mobile device (e.g., user equipment).

In various implementations, HetNet might be unavoidable to support the explosion of smartphones and the need for fast data speed and/or lack of available radio resources/spectrum. The various aspects disclosed herein can provide a more efficient manner of facilitating hand over in order to remain in the MIMO coverage area longer (based on various parameters and considerations), which can provide faster speed and/or low latency. Further, when a surge of capacity is a concern, the network can offload to a small cell properly. Without the disclosed aspects implemented with MIMO, full utilization capability of a wireless network might not be realized. Users (e.g., mobile devices) who could experience more speed capability would hand over sooner and when capacity is not demanded, in some aspects, the network may overload to the small cell with limited capability (e.g., 16 or 32 users). With tight spectrum and limited radio resources/processing, the disclosed aspects can provide a better user experience as well as other benefits, according to an example embodiment.

Included in wireless network environment 400 is a communication apparatus 402. For example, the communication apparatus 402 can be a mobile device (e.g., user equipment), a base station (e.g., eNB), another network device, another network node, and so on. Included in communication apparatus 402 is a MIMO availability identification component 404 configured to determine a first MIMO transmission scheme 406 of a first cell 408 and a second MIMO transmission scheme 410 of a second cell 412. The first cell 408 and second cell 412 can be configured to have interoperability such that the disclosed aspects can be employed if the cells are made by a common manufacturer or by different manufacturers.

For example, the first MIMO transmission scheme 406 can be one of combined transmit/receive diversity, beamforming, or spatial multiplexing and the second MIMO transmission scheme 410 can be one of combined transmit/receive diversity, beamforming, or spatial multiplexing. In accordance with some aspects, the first MIMO transmission scheme 406 and the second MIMO transmission scheme 410 can both be combined transmit/receive diversity, beamforming, or spatial multiplexing (e.g., the transmission schemes are the same). However, in accordance with other aspects, the first MIMO transmission scheme and the second MIMO transmission scheme can be different MIMO transmission schemes (e.g., one scheme is spatial multiplexing and the other is beamforming; one scheme is beamforming and the other is combined transmit/receive diversity; or one scheme is combined transmit/receive diversity and the other scheme is spatial multiplexing). In accordance with some aspects, at least one of the first MIMO transmission scheme or the second MIMO transmission scheme is a non-MIMO transmission scheme (e.g., one of combined transmit/receive diversity, beamforming, or spatial multiplexing is not utilized).

Also included in communication apparatus 402 is a handover adjustment component 414 configured to modify a handover timing parameter 416 as a function of the first MIMO transmission scheme 406 and the second MIMO transmission scheme 410. In an implementation, the handover adjustment component 414 can be configured to lengthen the handover timing parameter 416 in response to the first MIMO transmission scheme 406 having a higher rank (e.g., more desirable MIMO capabilities) than the second MIMO transmission scheme 410.

For example, a MIMO transmission scheme of combined transmit/receive diversity can be considered a Rank-1; a MIMO transmission scheme of beamforming can be considered a Rank-1; and a MIMO transmission scheme of spatial multiplexing can be considered a Rank-2. Further, for a non-MIMO implementation, the MIMO transmission scheme can be considered a Rank-0 or other designation to allow for appropriate ranking as disclosed herein. Thus, if the first MIMO transmission scheme 406 is spatial multiplexing (e.g., Rank-2) and the second MIMO transmission scheme 410 is combined transmit/receive diversity or beamforming (e.g., Rank-1), the handover timing parameter 416 can be lengthened to allow the mobile device to remain on the first cell 408 as long as possible before handing over to the second cell 412.

In another implementation, the handover adjustment component 414 can be configured to shorten the handover timing parameter 416 in response to the second MIMO transmission scheme 410 having a better MIMO performance than the first MIMO transmission scheme 406. For example, if the first MIMO transmission scheme 406 is combined transmit/receive diversity or beamforming (e.g., Rank-1) and the second MIMO transmission scheme 410 is spatial multiplexing (e.g., Rank-2), the handover timing parameter 416 is shortened such that handover from the first cell 408 to the second cell 412 occurs as fast as possible.

As previously mentioned, the references to a rank or a ranking order as utilized herein are arbitrary. Thus, according to alternative aspects, a Rank-1 can be considered better than a Rank 2. Further, a different type of scheme for determining whether a particular cell provides better coverage than another cell can be utilized in addition to, or in place of, a ranking order.

In accordance with some aspects, the MIMO availability identification component 404 can be further configured to identify a non-MIMO transmission scheme. In this situation, the handover adjustment component 414 can be configured to change a handover timing parameter 416 wherein handover to the second cell 412 occurs faster in response to the first cell 408 being identified with the non-MIMO transmission scheme.

Alternatively or additionally, the MIMO availability identification component 404 can be further configured to identify a non-MIMO transmission scheme and the handover adjustment component 414 can be configured to change a handover timing parameter 416 wherein handover to the second cell 412 occurs slower in response to the second cell 412 being identified with the non-MIMO transmission scheme (e.g., the mobile device remains on the first cell 408 as long as possible).

In an example implementation, the first MIMO transmission scheme 406 and the second MIMO transmission scheme 410 can have a same rank. In this case, the handover adjustment component 414 can be configured to utilize an existing or standard handover time parameter. For example, the handover adjustment component 414 can utilize a default handover time parameter, for example as employed by LTE Rel 8/9.

In accordance with some aspects, the first cell 408 and the second cell 412 can utilize a same frequency partitioning. For example, both cells can utilize full frequency reuse, hard frequency reuse, fractional frequency reuse, or soft frequency reuse. In accordance with other aspects, the first cell 408 and the second cell 412 can utilize a different frequency spectrum (e.g., can operate with the contiguous or non-contiguous frequency bands). In an implementation, the first cell can be a macro cell and the second cell can be a small cell. In another implementation, the first cell is a small cell and the second cell is a macro cell. In various other aspects, the first and second cells are macro cells. In a further aspect, the first and second cells are small cells.

Figure 5:
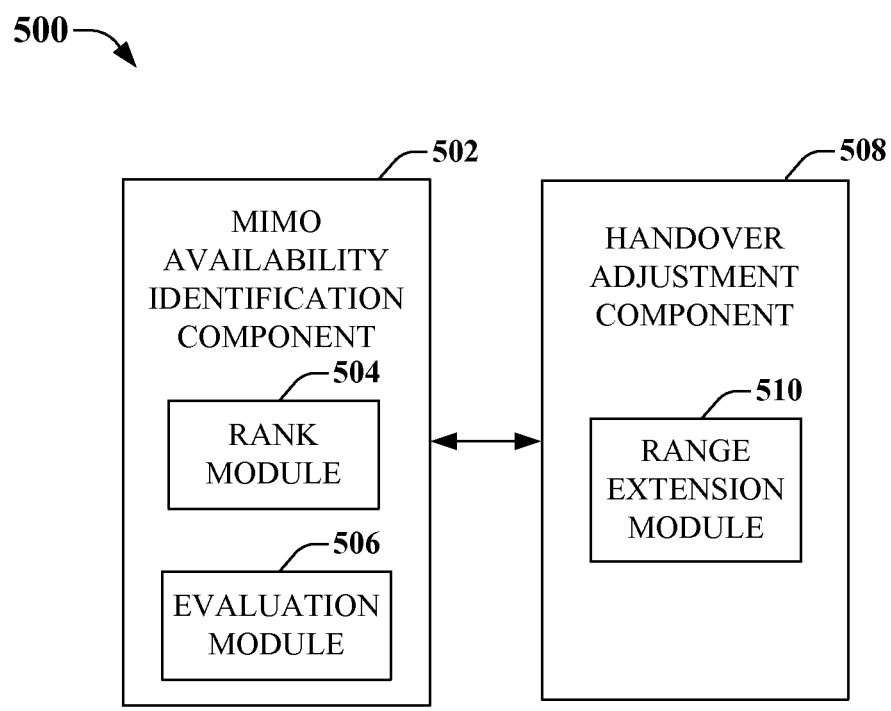
FIG. 5 illustrates an example non-limiting system configured to provide range extension, according to an aspect.

FIG. 5 illustrates an example non-limiting system 500 configured to provide range extension, according to an aspect. Range extension can be utilized at or about the same time as range expansion, according to an aspect. The decision of whether to utilize range extension and/or range expansion can be made with a focus on performance, according to an aspect.

System 500 includes a MIMO availability identification component 502 configured to ascertain whether a MIMO transmission scheme is provided by various macro cells and/or small cells. In accordance with some aspects, MIMO availability identification component 502 is configured to determine that one or more of the macro cells and/or small cells do not provide MIMO.

To facilitate ranking of the various macro cells and/or small cells, MIMO availability identification component 502 can include a rank module 504 configured to assign a rank to each of the macro cells and/or small cells. However, as previously discussed means other than rank for classifying respective MIMO performance of cells can be utilized. In accordance with some aspects, rank module 504 obtains the rank of each of the cells through another means (e.g., from a database, from a measurement reported by one or more mobile devices, and so forth). In accordance with some aspects, the rank module can rank cells that do not provide MIMO as a Rank-0. The rank module 504 can rank cells that provide combined transmit/receive diversity and/or beamforming as a Rank-1. Further, the rank module 504 can rank cells that provide spatial multiplexing as a Rank-2. Additional rankings can also be assigned based on other considerations. In alternative aspects, a cell that provides better MIMO performance, such as spatial multiplexing, can be classified as a Rank-1 and a cell that provides combined transmit/receive diversity and/or beamforming can be classified as a Rank-2.

Also included in MIMO availability identification component 502 is an evaluation module 506 configured to compare the ranking of the cells when a mobile device is to transfer from a first cell to a second cell or at a different time (e.g., in anticipation of handover). For example, a cell assigned a Rank-2 can be a higher ranking (or provides better MIMO performance) than a cell assigned a Rank-1 or Rank-0. Further a cell assigned a Rank-1 can be a higher ranking (e.g., better MIMO performance) than a cell assigned a Rank-0. If the cells have the same rank, evaluation module 506 can indicate that the MIMO availability of the cells is equal or substantially the same.

The evaluation module 506 can provide the relative ranking of one or more cells to a handover adjustment component 508 (and/or to a database). The handover adjustment component 508 can be configured to adjust one or more timing parameters based on the relative rankings of the cells. For example, if the mobile device is to hand over to a cell that is assigned a higher ranking (e.g., associated with a more desirable MIMO performance) than a source cell, one or more timing parameters can be shortened such that the handover occurs quicker as compared to a uniform handover boundary. In another example, if the mobile device is to hand over to a cell that is assigned a lower ranking (e.g., associated with a less desirable MIMO performance) than a source cell, one or more timing parameters can be lengthened such that the handover occurs slower as compared to a uniform handover boundary.

In accordance with some aspects, the handover adjustment component 508 can include a range extension module 510 that can be configured to facilitate extension of a range. For example, if the mobile device is to hand over to a small cell and is slightly out of range of the small cell, the range extension module 510 can provide information to the small cell. Such information can allow the small cell to accept the mobile device, even though the mobile device is not yet within the range of the small cell. For example, the information provided can include an adjustment to a dB or other parameter that can be utilized by the small cell (e.g., target cell, source cell, mobile device, and so on) in order for extension of the range.

In a similar manner, if the mobile device should remain in the source cell longer (e.g., because the source cell has a higher ranking, better MIMO performance, more desirable MIMO performance, and so on), the range extension module 510 can provide the information to the source cell in order for range of the source cell to be extended. In such a manner, the spectrum efficiency of HetNet deployment can be improved, according to an aspect.

Figure 6:
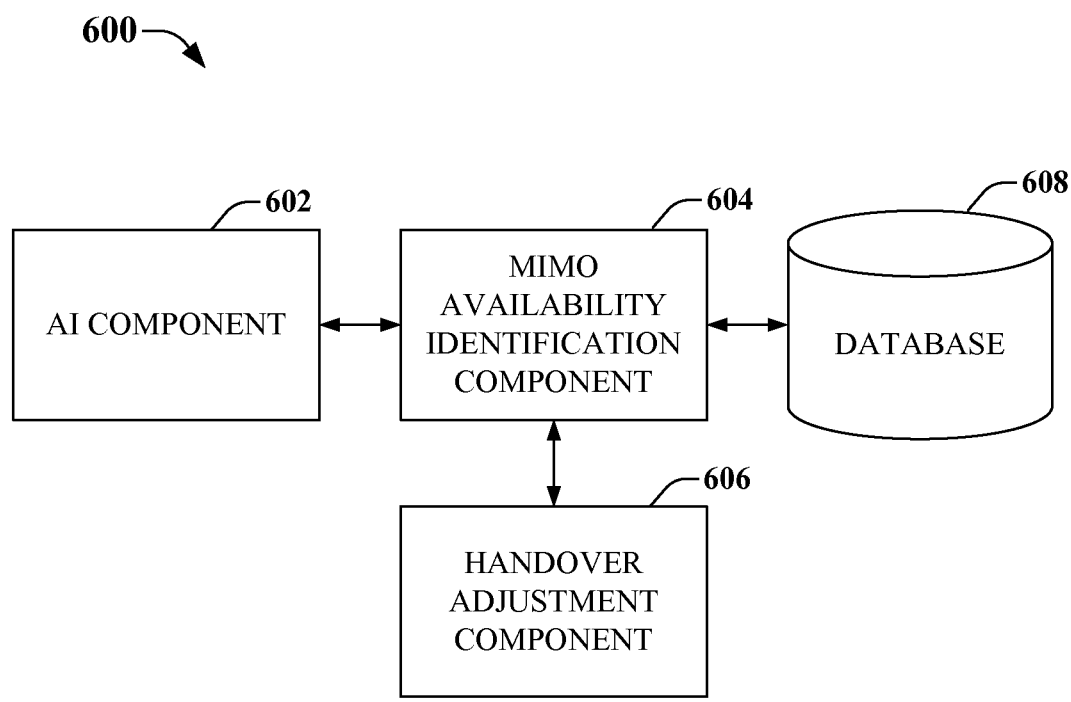
FIG. 6 illustrates an example system that employs an artificial intelligence component, which facilitates automating one or more features in accordance with the disclosed aspects.

FIG. 6 illustrates an example system 600 that employs an artificial intelligence (AI) component 602, which facilitates automating one or more features in accordance with the disclosed aspects. A MIMO availability identification component 604, handover adjustment component 606, database 608, as well as other components (not illustrated) can include functionality, as more fully described herein, for example, with regard to the previous figures. The disclosed aspects (e.g., in connection with expanding and/or extending a range of mobile equipment in a wireless network environment) can employ various AI-based schemes for carrying out various aspects thereof. For example, a process for distinguishing ranks of a first cell and second cell (or source cell and target cell), determining which cell has a better MIMO performance (which can be defined in terms of higher arbitrary rank) or if the cells have the same rank, shortening a handover transition time, lengthening a handover transition time, and so forth, can be facilitated via an example automatic classifier system and process.

An example classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that should be automatically performed. In the case of communication systems, for example, attributes can be information stored in database 608, and the classes can be categories or areas of interest (e.g., levels of relative rank of each cell).

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

As will be readily appreciated, the disclosed aspects can employ classifiers that are explicitly trained (e.g., via a generic training data) as well as implicitly trained (e.g., via observing UE behavior, receiving extrinsic information, and so on). For example, SVMs can be configured via a learning or training phase within a classifier constructor and feature selection module. Thus, the classifier(s) can be used to automatically learn and perform a number of functions, including but not limited to determining according to a predetermined criteria whether to delay handover, whether to shorten a time for handover, whether to use a default handover value, and so on. The criteria can include, but is not limited to, historical patterns, UE behavior, user preferences, service provider preferences and/or policies, location of the UE, motion of the UE, location of the femtocell, location of the macro cell, and so on.

In view of the example systems shown and described herein, methods that may be implemented in accordance with the one or more disclosed aspects, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methods described hereinafter. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methodologies to various devices. Those skilled in the art will understand and appreciate that a method could alternatively be represented as a series of interrelated states or events, such as in a state diagram.

Figure 7:
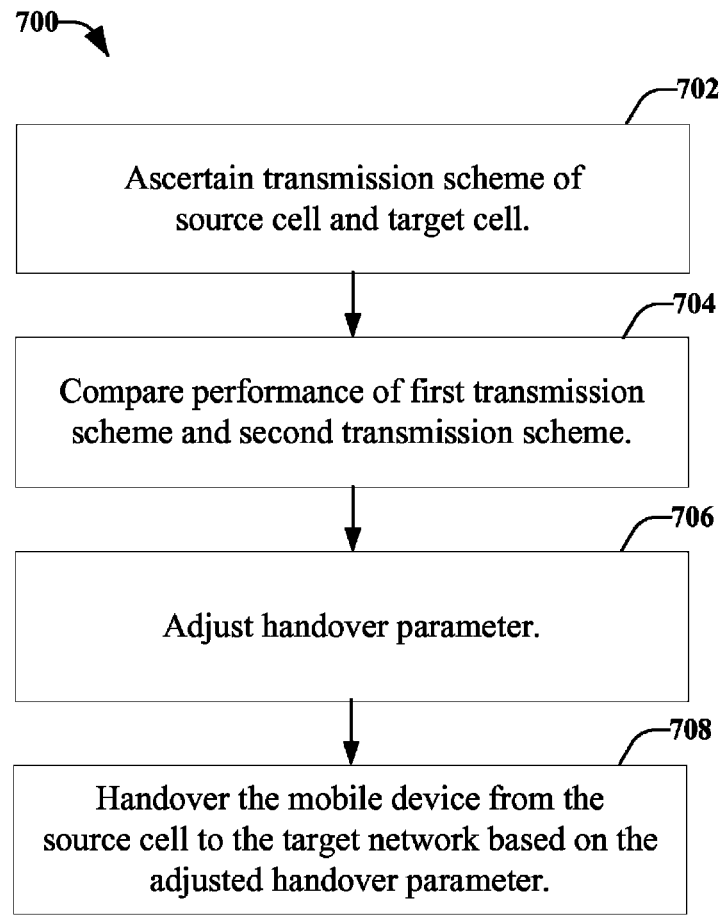
FIG. 7 illustrates a method for range expansion, according to an aspect.

FIG. 7 illustrates a method 700 for range expansion, according to an aspect. In accordance with some aspects, the method 700 can be implemented by a system comprising at least one processor. In accordance with other aspects, a processor can be employed to facilitate execution of computer executable instructions stored in memory to perform the method 700.

Method 700 starts, at 702, when a source cell Multiple-Input Multiple-Output (MIMO) transmission scheme and a target cell MIMO transmission scheme can be ascertained. For example, the transmission scheme of the source cell can be determined at or about the same time as the mobile device is within the coverage area of the source cell and the transmission scheme of the target cell can be determined when an indication that the mobile device should be handed over to the target cell is received. However, in some aspects, the transmission scheme of either or both cells can be determined before an indication that the mobile device will be handed over to the target cell has been received, or at a different time.

At 704, performance of the source cell MIMO transmission scheme and the target cell MIMO transmission scheme can be compared. In an aspect, the performance can be determined based on an arbitrary rank of each cell. For example, the type of MIMO transmission scheme utilized by each of the cells can be utilized to determine if the respective cell is a non-MIMO cell, a Rank-1 MIMO cell, a Rank-2 MIMO cell, or a different rank.

Based on the comparison of the cell ranks, at 706, a handover parameter can be adjusted. For example, if the first cell is a Rank-2 MIMO cell and the second cell is a Rank-1 MIMO cell, the adjustment can be made such that the mobile device remains on the first cell as long as possible before handing over to the second cell. In another example, the first cell is a Rank-1 MIMO cell and the second cell is a Rank-2 MIMO cell. Further to this example, the adjustment is made such that the mobile device is handed over to the second cell as soon as possible. By adjusting the handover parameter in order to retain the mobile device in Rank-2 coverage as long as possible (or as soon as possible), improvements to network efficiency and the user experience (e.g., better quality communications, and so forth) can be realized, according to an example embodiment. The mobile device can be handed over from the source cell to the target cell, at 708, based on the adjusted handover parameter.

Figure 8:
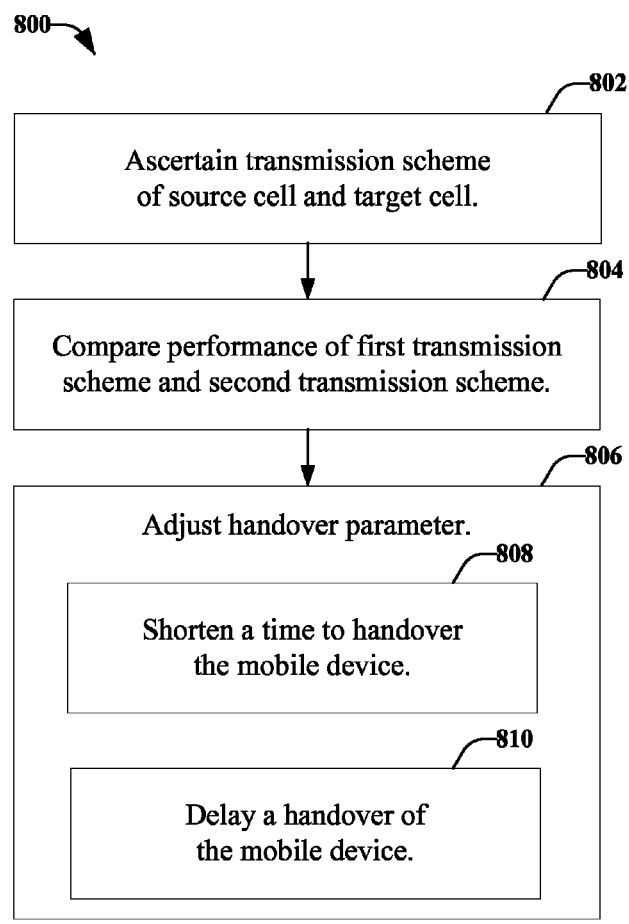
FIG. 8 illustrates an alternative method for range expansion, according to an aspect.

FIG. 8 illustrates an alternative method 800 for range expansion, according to an aspect. At 802, a source cell MIMO transmission scheme and a target cell MIMO transmission scheme can be ascertained. The respective performance of the two transmissions schemes can be compared, at 804. Based on the comparison, a handover parameter can be adjusted, at 806.

In accordance with some aspects, the adjustment can comprise, at 808, shortening a time to hand over the mobile device from the source cell to the target cell as compared to a uniform handover boundary being used for the handover. For example, if the source cell is a Rank-1 cell and the target cell is a Rank-2 cell, at 804, the comparison reveals that the target cell has better MIMO performance. In this case, it would be beneficial to hand over the mobile device to the target cell as quickly as possible in order for the benefits of the Rank-2 cell to be realized by the mobile device (and the mobile device user).

Alternatively, the adjustment can comprise, at 810, delaying a handover of the mobile device from the source cell to the target cell as compared to a uniform handover boundary being used for the handover. For example, if the source cell is a Rank-2 cell and the target cell is a Rank-1 cell, at 804, the comparison reveals that the source cell has better MIMO performance than the target cell. In this case, it would be beneficial to retain the mobile device on the source cell as long as possible before handover to the cell that has a less desirable MIMO performance.

Figure 9:
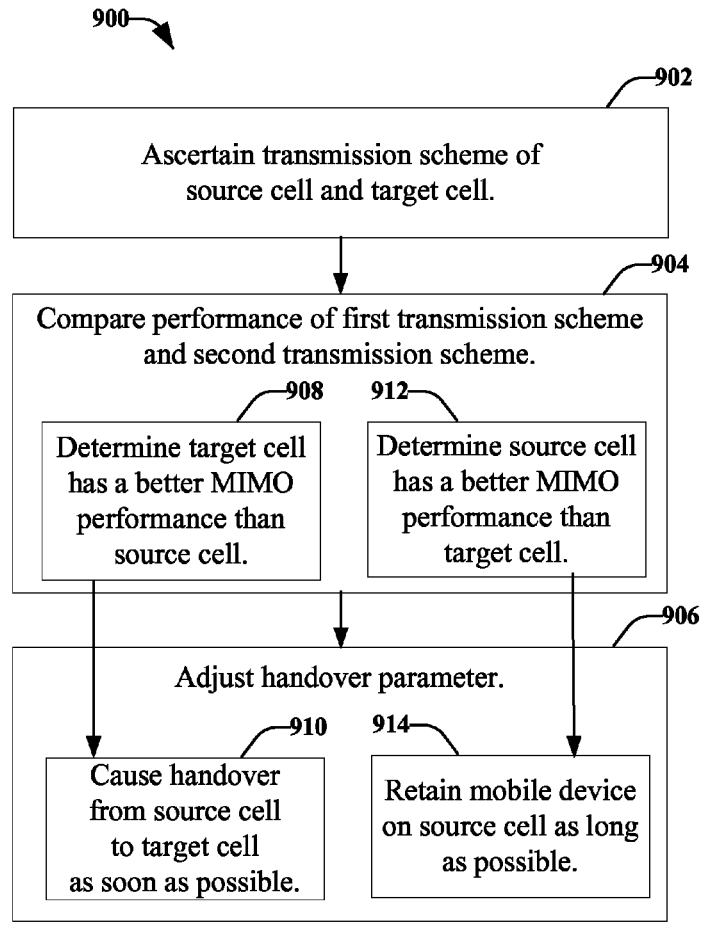
FIG. 9 illustrates another alternative method for range expansion in a wireless network environment, according to an aspect.

FIG. 9 illustrates another alternative method 900 for range expansion in a wireless network environment, according to an aspect. At 902, a source cell MIMO transmission scheme and a target cell MIMO transmission scheme can be ascertained. The respective performance of the two transmissions schemes are compared, at 904. Based on the comparison, a handover parameter can be adjusted, at 906.

In accordance with some aspects, the comparison can comprise determining, at 908, the target cell has a better MIMO performance than the source cell. For example, the source cell can comprise a rank-1 MIMO transmission scheme and the target cell comprises a rank-2 MIMO transmission scheme. At 910, the mobile device can be handed over from the source cell to the target cell, almost instantaneously (or as fast as possible). As utilized herein, the term "instantaneously" means within a reasonable amount of time, taking into account the time needed for actions to be performed.

According to an alternative aspect, the comparison can comprise determining, at 912, that the source cell has a better MIMO performance than the target cell. For example, the source cell can comprise a rank-2 MIMO transmission scheme and the target cell comprises a rank-1 MIMO transmission scheme. At 914, the mobile device is retained on the source cell longer than a uniform handover boundary. For example, the mobile device is retained on the source cell as long as possible before handover is performed in order to maintain connectivity with, and obtain the benefits of, the source cell.

In another alternative aspect, the ascertaining, at 902, can comprise determining the source cell MIMO transmission scheme is one of combined transmit/receive diversity, beamforming, or spatial multiplexing and the target cell MIMO transmission scheme is one of combined transmit/receive diversity, beamforming, or spatial multiplexing.

Figure 10:
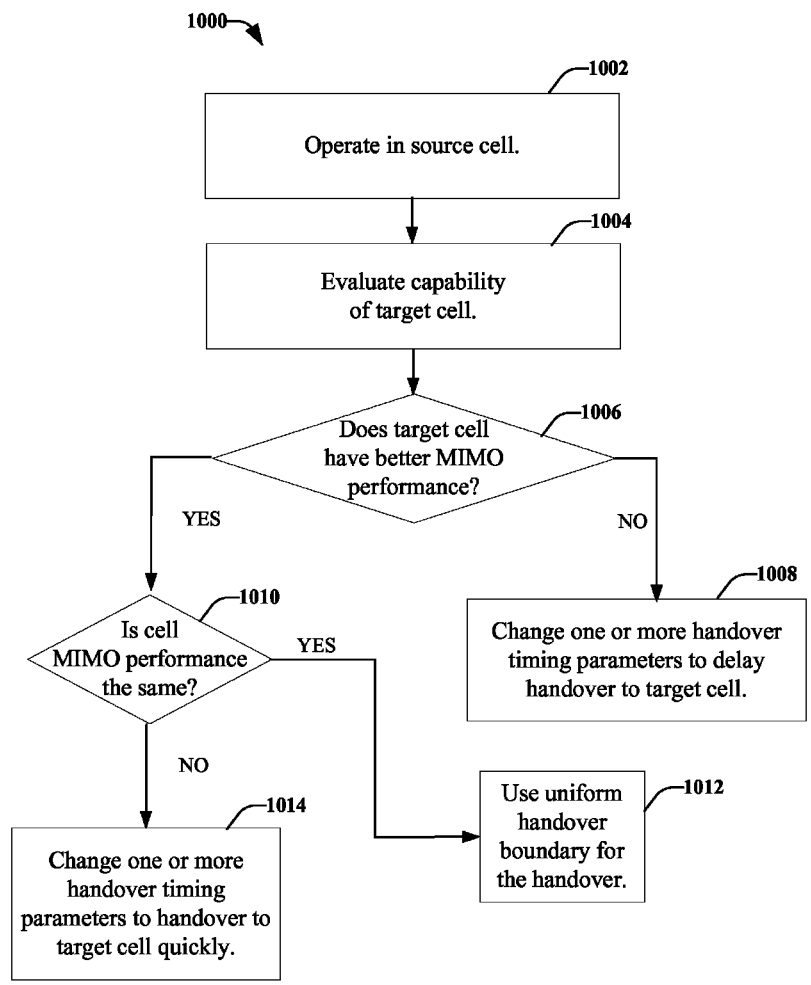
FIG. 10 illustrates another method for range expansion, according to an aspect.

FIG. 10 illustrates another method 1000 for range expansion, according to an aspect. Method 1000 is configured to improve spectrum efficiency and device performance by allowing a device to remain in a cell under a better performance MIMO capability (e.g., a Rank-2 MIMO) as long as possible before handing over to a cell having a Rank-1 MIMO capability or a non-MIMO capability. As discussed above, as used herein MIMO refers to a radio interface that has at least two antennas on both the transmitter side and the receiver side.

At 1002, a device is operated within a source cell. The source cell can have MIMO capability or, in some aspects, the source cell does not have MIMO capability. The MIMO capability of the source cell can be a Rank-1 MIMO capability, a Rank-2 MIMO capability, or another rank. A target cell can be evaluated, at 1004, to ascertain the capability of the target cell. For example, the target cell can have Rank-1 MIMO capability, Rank-2 MIMO capability, another rank, or non-MIMO capability.

At 1006, a determination is made whether the target cell has better MIMO performance (e.g., more desirable MIMO performance, a higher rank, and so forth) than the source cell. In accordance with some aspects, a cell without MIMO capability is indicated as a Rank-0 MIMO capability (or another type of designation).

If the source cell has better MIMO performance than the target cell ("NO"), at 1008, one or more handover timing parameter can be modified to delay handover of the mobile device to the target cell. If the target cell has a more desirable MIMO performance than the source cell ("YES"), a determination is made, at 1010, whether the performance of the cells is the same (where the performance can be expressed in terms of a rank).

If the performance of the cells is the same ("YES"), it indicates, for example, that both source and target cells are non-MIMO, both cells are Rank-1, both cells are Rank-2, and so forth. If the performance is the same, a uniform handover boundary is used for the handover, at 1012.

If the performance of the cells is not the same ("NO"), it indicates that the target cell has better MIMO performance than the source cell. Thus, at 1014, one or more handover timing parameters can be modified such that the mobile device is handed over from the source cell to the target cell as quickly as possible.

Figure 11:
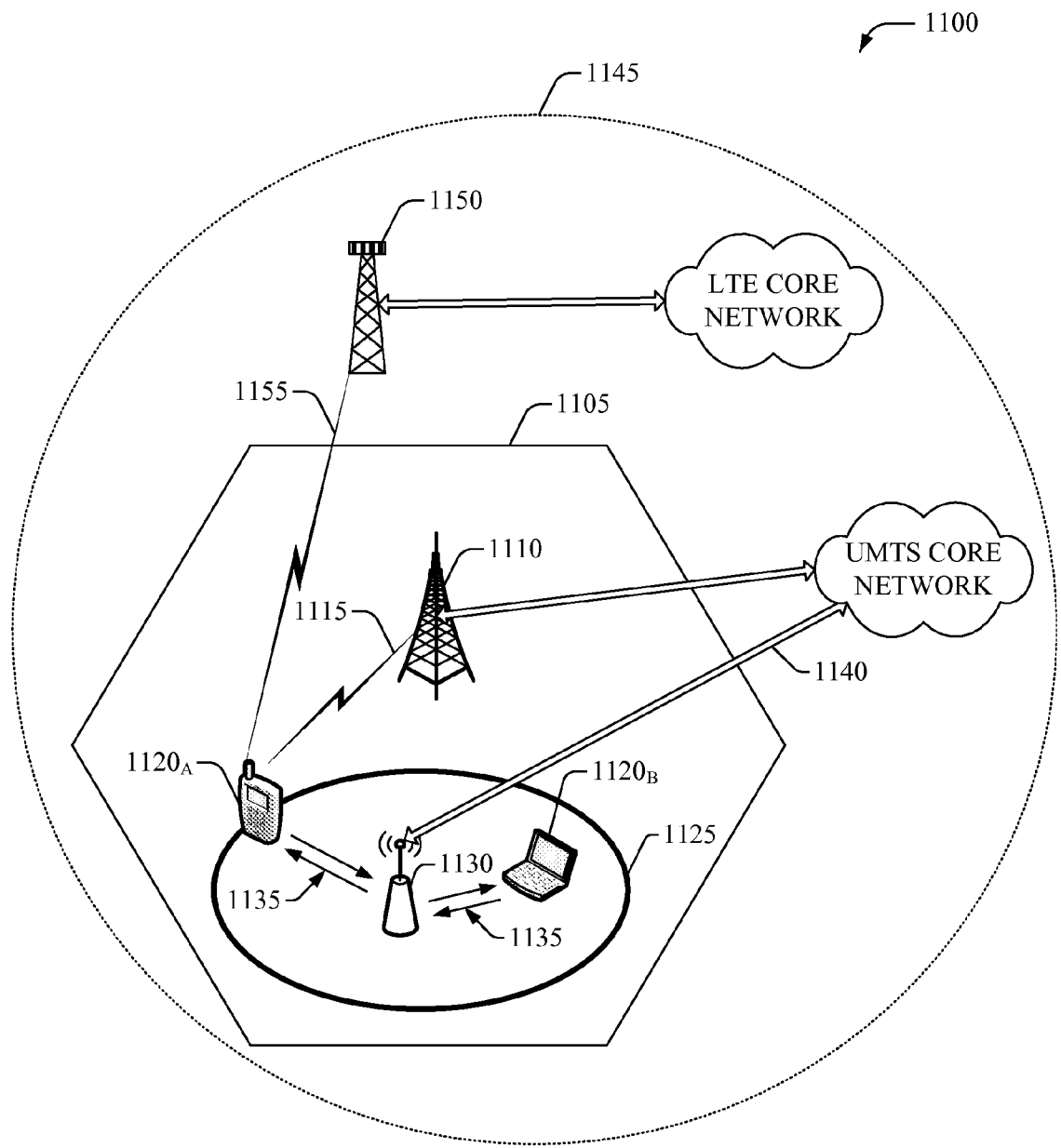
FIG. 11 illustrates a schematic wireless environment in which a femtocell can exploit various aspects disclosed herein.

FIG. 11 illustrates a schematic wireless environment 1100 (e.g., a network) in which a femtocell can exploit various aspects disclosed herein. In wireless environment 1100, area 1105 can represent a coverage macro cell, which can be served by base station 1110. Macro coverage may be generally intended for outdoors locations for servicing mobile wireless devices, such as UE 1120A, and such coverage can be achieved through a wireless link 1115. In an aspect, UE 1120 can be an LTE mobile device substantially similar to and including functionality associated with UEs (or mobile devices) described herein.

Within macro coverage cell 1105, a femtocell 1125, served by a femto access point 1130, can be deployed. A femtocell can cover an area 1125 that is determined, at least in part, by transmission power allocated to a femto access point (FAP) 1130, path loss, shadowing, and so forth. Coverage area can be spanned by a coverage radius that ranges, for example, from 20 to 50 meters. Confined coverage area 1125 can be associated with an indoors area, or a building, which can span about 5000 sq. ft., for example. FAP 1130 can service a number (e.g., a few or more) wireless devices (e.g., subscriber station 1120B) within confined coverage area 1125. In an aspect, FAP 1130 can integrate seamlessly with substantially any PS-based and CS-based network; for instance, FAP 1130 can integrate into an existing 3GPP Core via conventional interfaces such as Iu-CS, Iu-PS, Gi, Gn. In another aspect, FAP 1130 can exploit high-speed downlink packet access in order to accomplish substantive bitrates. In yet another aspect, FAP 1130 comprises a LAC (location area code) and RAC (routing area code) that can be different from the underlying macro network. These LAC and RAC can be used to identify subscriber station location for a variety of reasons (e.g., to direct incoming voice and data traffic to appropriate paging transmitters). Further, the LAC can be utilized to differentiate the femtocell 1130 from the macro cell 1110.

The macro coverage cell 1105 and femtocell 1125 can be overlaid by an LTE network. Area 1145 can represent a coverage area of the LTE cell, which can be served by base station 1150. According to an aspect, UE 1120A can detect the femtocell 1125 based on LAC data (and/or Wi-Fi logic). On detection, UE 1120A can attach to the FAP 1130 through transmission and reception of attachment signaling effected through a FL/RL 1135. Attachment attempts are a part of procedures to ensure mobility, so voice calls and sessions can continue even after a macro-to-femto transition or vice versa. Femto networks are also designed to serve stationary or slow-moving traffic with reduced signaling loads compared to macro networks.

When an attachment attempt is successful, UE 1120A can be allowed on femtocell 1125, and incoming voice and data traffic can be paged and routed to the subscriber station through the FAP 1130. It is to be noted also that data traffic can be routed through a backhaul broadband wired network backbone 1140 (e.g., optical fiber backbone, twisted-pair line, T1/E1 phone line, DSL, or coaxial cable). It is to be noted that as a FAP 1130 can rely on a backhaul network backbone 1140 for routing and paging, and for packet communication, substantially any quality of service can handle heterogeneous packetized traffic. Namely, packet flows established for wireless communication devices (e.g., terminals 1120A and 1120B) served by FAP 1130, and for devices served through the backhaul network pipe 1140.

Figure 12:
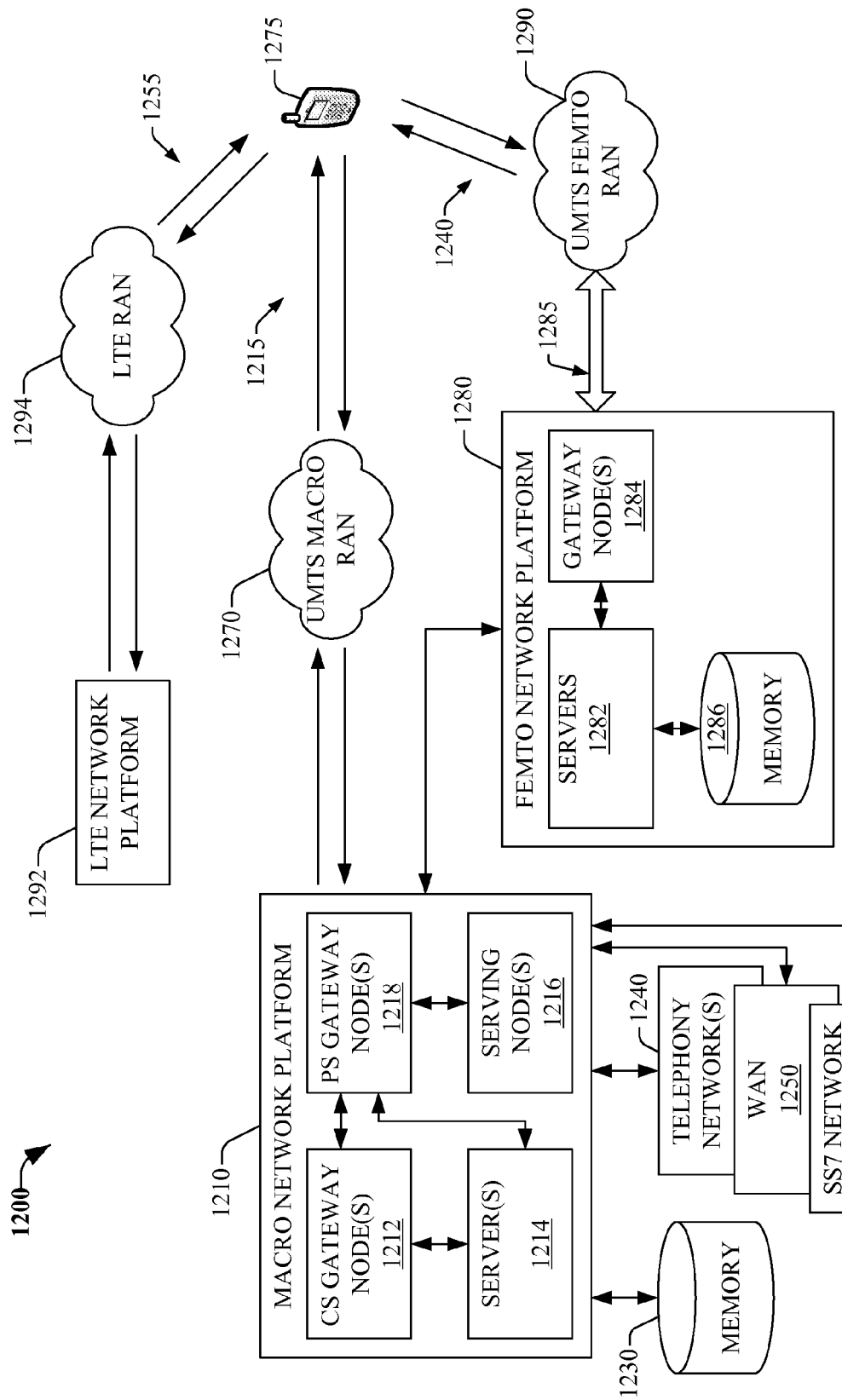
FIG. 12 illustrates an example wireless communication environment, with associated components for operation of a femtocell, according to an aspect.

To provide further context for various aspects of the subject specification, FIG. 12 illustrates an example wireless communication environment 1200, with associated components for operation of a femtocell, according to an aspect. Wireless communication environment 1200 can include three wireless network platforms: (i) A macro network platform 1210 that serves (or facilitates communication) with user equipment 1275 through a macro radio access network (RAN) 1270. It should be appreciated that in cellular wireless technologies, macro network platform 1210 can be embodied in a Core Network. (ii) A femto network platform 1280, which can provide communication with UE 1275 through a femto RAN 1290 linked to the femto network platform 1280 through backhaul pipe(s) 1285, wherein backhaul pipe(s) can be substantially the same as backhaul link 1140. (iii) An LTE network platform 1292 that serves (or facilitates communication) with user equipment 1275 through an LTE RAN 1294. It should be appreciated that femto network platform 1280 can offload UE 1275 from macro network/LTE network, once UE 1275 attaches to femto RAN.

It is noted that RAN can include base station(s), or access point(s), and its associated electronic circuitry and deployment site(s), in addition to a wireless radio link operated in accordance with the base station(s). Accordingly, macro RAN 1270 can comprise various coverage cells, such as cell 1105, femto RAN 1290 can comprise multiple femtocell access points, such as 1130, and LTE RAN 1294 can comprise various coverage cells, such as cell 1145. The LTE network platform 1292 can include components, such as, nodes, gateways, interfaces, servers, or platforms that facilitate packet-switched (PS) traffic. Further, macro network platform 1210 can include CS gateway node(s) 1212 which can interface CS traffic received from legacy networks, such as telephony network(s) 1240 (e.g., public switched telephone network (PSTN), or public land mobile network (PLMN)) or a SS7 network 1260. Moreover, CS gateway node(s) 1212 interfaces CS-based traffic and signaling and gateway node(s) 1218.

In addition to receiving and processing CS-switched traffic and signaling, gateway node(s) 1218 can authorize and authenticate PS-based data sessions with served (e.g., through macro RAN) wireless devices. Data sessions can include traffic exchange with networks external to the macro network platform 1210, such as wide area network(s) (WANs) 1250; it should be appreciated that local area network(s) (LANs) can also be interfaced with macro network platform 1210 through gateway node(s) 1218. Gateway node(s) 1218 generates packet data contexts when a data session is established. It should be further appreciated that the packetized communication can include multiple flows that can be generated through server(s) 1214. Macro network platform 1210 also includes serving node(s) 1216 that convey the various packetized flows of information or data streams, received through gateway node(s) 1218. It is to be noted that server(s) 1214 can include one or more processors configured to confer at least in part the functionality of macro network platform 1210. To that end, the one or more processor can execute code instructions stored in memory 1230, for example.

In example wireless environment 1200, memory 1230 can store information related to operation of macro network platform 1210. Information can include business data associated with subscribers; market plans and strategies, e.g., promotional campaigns, business partnerships; operational data for mobile devices served through macro network platform; service and privacy policies; end-user service logs for law enforcement; and so forth. Memory 1230 can also store information from at least one of telephony network(s) 1240, WAN(s) 1250, or SS7 network 1260.

Femto gateway node(s) 1284 can have substantially the same functionality as PS gateway node(s) 1218. Additionally, femto gateway node(s) 1284 can also include substantially all functionality of serving node(s) 1216. In an aspect, femto gateway node(s) 1284 can facilitate handover resolution, e.g., assessment and execution. Server(s) 1282 can have substantially the same functionality as described in connection with server(s) 1214 and can include one or more processor configured to confer at least in part the functionality of macro network platform 1210. To that end, the one or more processor can execute code instructions stored in memory 1286, for example.

Memory 1286 can include information relevant to operation of the various components of femto network platform 1280. For example operational information that can be stored in memory 1286 can comprise, but is not limited to, subscriber information; contracted services; maintenance and service records; femtocell configuration (e.g., devices served through femto RAN 1290; access control lists, or white lists); service policies and specifications; privacy policies; add-on features; and so forth.

Figure 13:
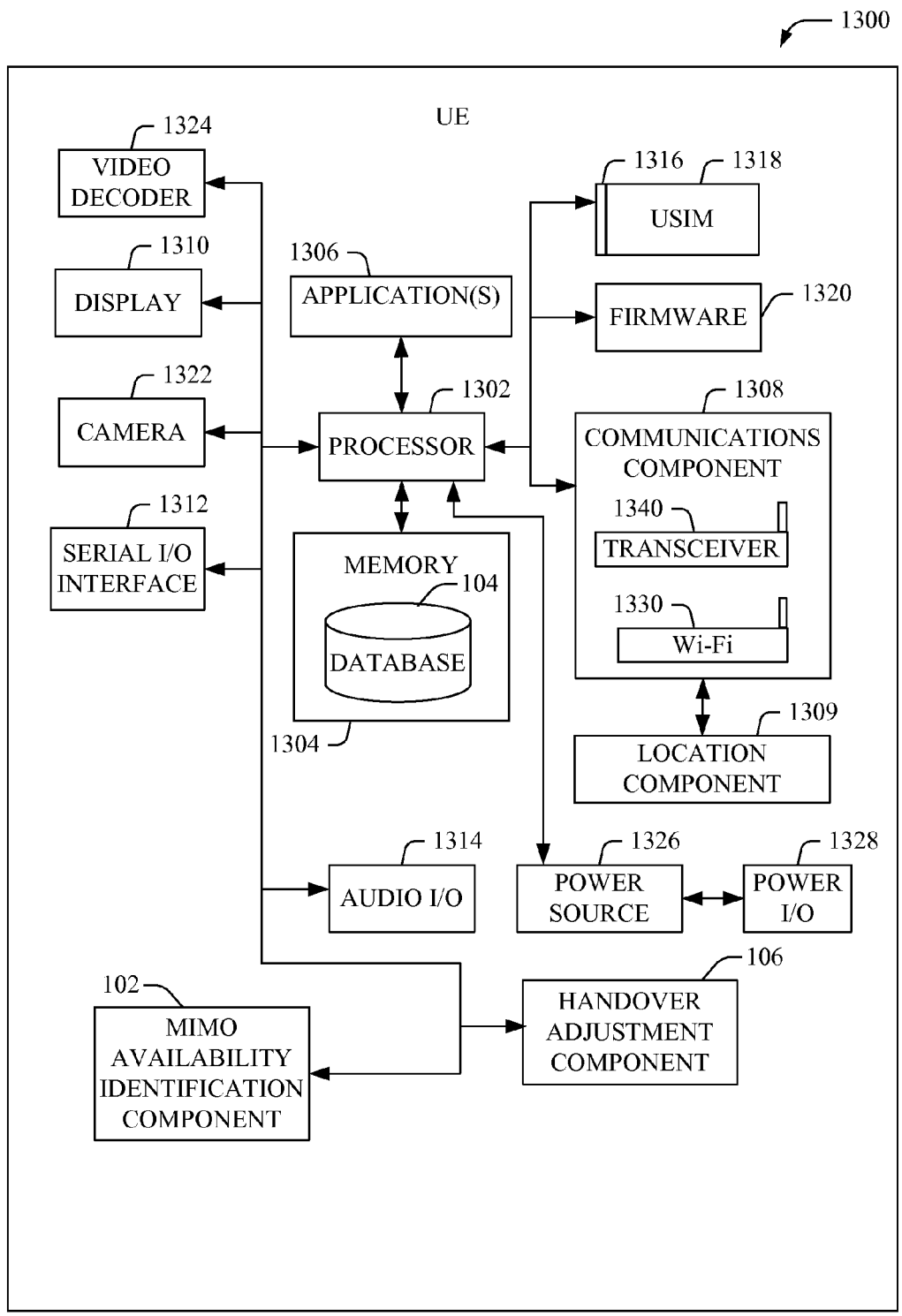
FIG. 13 illustrates a block diagram of an example embodiment of a user equipment, which can facilitate improved long-term evolution to Universal Mobile Telecommunications System femto mobility in accordance with aspects described herein.

Referring now to FIG. 13, illustrated is a block diagram of an example embodiment 1300 of a UE, which can facilitate improved LTE to UMTS femto mobility in accordance with aspects described herein. The UE 1300 can include a processor 1302 for controlling all onboard operations and processes. A memory 1304 can interface to the processor 1302 for storage of data (e.g., database 104, and so forth) and one or more applications 1306 being executed by the processor 1302. A communications component 1308 can interface to the processor 1302 to facilitate wired/wireless communication with external systems (e.g., UMTS femtocell, UMTS macro cell, LTE cell) by employing transceiver 1340. In an aspect, the transceiver 1340 can receive a broadcast message comprising carrier signal LACs. In one example, the communications component 1308 can include a Wi-Fi modem that facilitates communication over a Wi-Fi network. Further, the communications component 1308 can interface to a location component 1309 (e.g., GPS transceiver) that can facilitate location detection of the UE 1300. Note that the location component 1309 can also be included as part of the communications component 1308.

The UE 1300 can include a display 1310 for displaying content downloaded and/or for displaying text information related to operating and using the device features. A serial I/O interface 1312 is provided in communication with the processor 1302 to facilitate serial communication (e.g., USB, and/or IEEE 1394) via a hardwire connection. Audio capabilities are provided with an audio I/O component 1314, which can include a speaker for the output of audio signals related to, for example, recorded data or telephony voice data, and a microphone for inputting voice signals for recording and/or telephone conversations.

The device 1300 can include a slot interface 1316 for accommodating a Universal subscriber identity module (USIM) 1318. Firmware 1320 is also provided to store and provide to the processor 1302 startup and operational data. The UE 1300 can also include an image capture component 1322 such as a camera and/or a video decoder 1324 for decoding encoded multimedia content. Further, the UE 1300 can include a power source 1326 in the form of batteries, which power source 1326 interfaces to an external power system or charging equipment via a power I/O component 1328. In addition, the UE 1300 can be substantially similar to and include functionality associated with UEs (e.g., mobile devices) described above. Moreover, UE 1300 can include a MIMO availability identification component 102 and handover adjustment component 106, which can include respective functionality, as more fully described herein.

Figure 14:
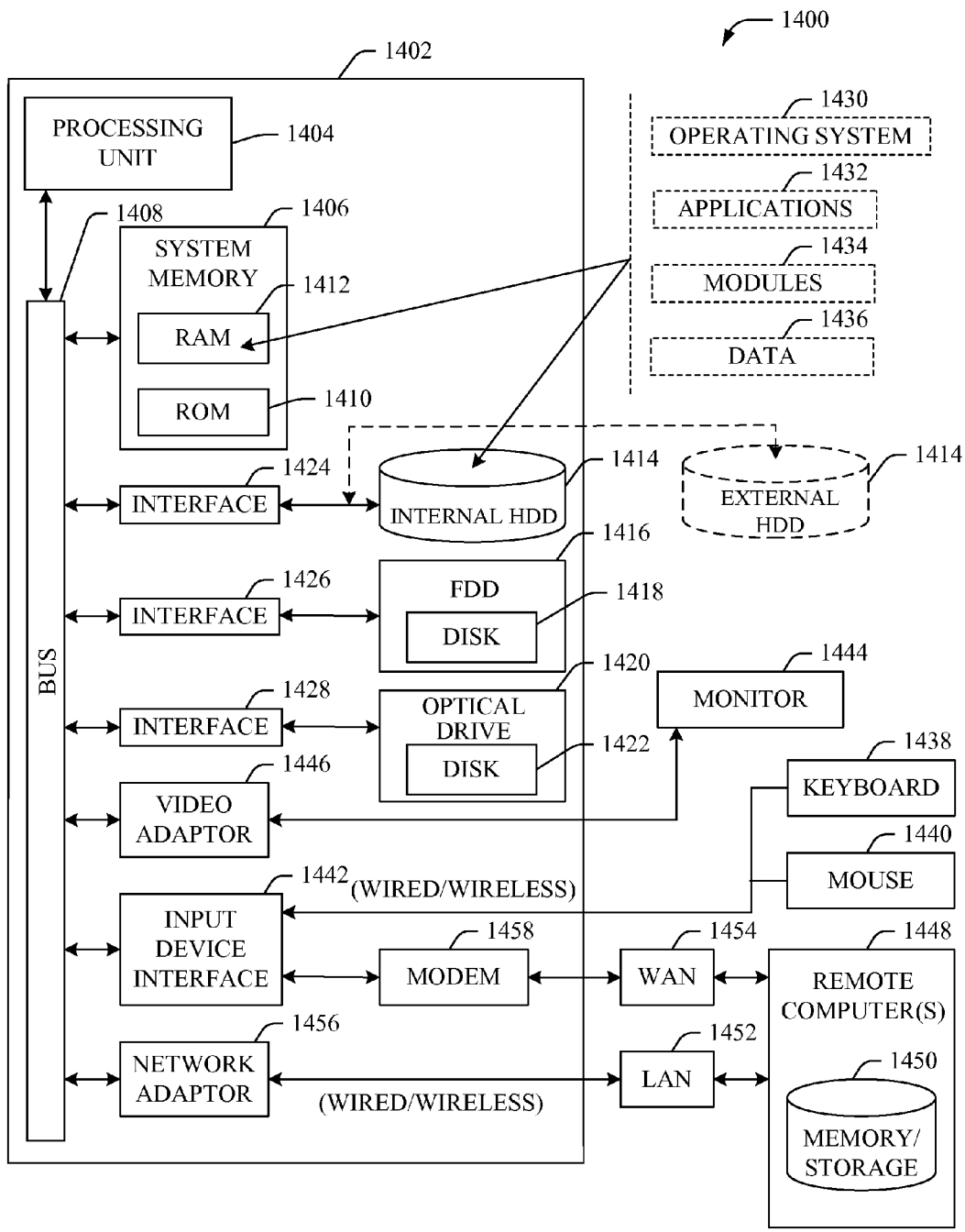
FIG. 14 illustrates a block diagram of a computer operable to execute the disclosed communication architecture, according to an aspect.

Referring now to FIG. 14, there is illustrated a block diagram of a computer operable to execute the disclosed communication architecture, according to an aspect. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Program modules include routines, programs, components, data structures, etc., that perform particular tasks or implement particular abstract data types. Moreover, those skilled in the art will appreciate that the disclosed aspects can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) can include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 through an interface, such as a video adapter 1446. In addition to the monitor 1444, a computer includes other peripheral output devices (not shown), such as speakers, printers, etc.

The computer 1402 can operate in a networked environment using logical connections through wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a), 54 Mbps (802.11b), or 150 Mbs (802.11n) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

It is to be noted that aspects, features, or advantages of the aspects described in the subject specification can be exploited in substantially any communication technology. For example, 4G technologies, Wi-Fi, WiMAX, Enhanced GPRS, 3GPP LTE, 3GPP2 UMB, 3GPP UMTS, HSPA, HSDPA, HSUPA, GERAN, UTRAN (Universal Terrestrial Radio Access Network), LTE Advanced, Zigbee, or other IEEE 802.XX technology. Additionally, substantially all aspects disclosed herein can be exploited in legacy telecommunication technologies; e.g., GSM. In addition, mobile as well non-mobile networks (e.g., Internet, data service network such as IPTV (IP Television)) can exploit aspect or features described herein.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

Computing devices include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. Yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

The term "set", "subset", or the like as employed herein excludes the empty set (e.g., the set with no elements therein). Thus, a "set", "subset", or the like includes one or more elements or periods, for example. As an illustration, a set of periods includes one or more periods; a set of transmissions includes one or more transmissions; a set of resources includes one or more resources; a set of messages includes one or more messages, and so forth.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system for performing a handover, comprising:
a memory to store executable instructions; and
a processor, coupled to the memory, that facilitates execution of the executable instructions to perform operations, comprising:
determining a first protocol supported by a first multiple-input multiple-output transmission of a first set of network devices of a first network and a second protocol supported by a second multiple-input multiple-output transmission of a second set of network devices of a second network; and
modifying a network transfer timing parameter as a function of the first protocol having been determined to comprise a first performance level and the second protocol having been determined to comprise a second performance level, wherein the network transfer timing parameter identifies a time pertaining to network traffic being routed from the first set of network devices to the second set of network devices.

2. The system of claim 1, wherein the operations further comprise: lengthening the time of the network transfer timing parameter comprising delaying a routing of the network traffic from the first set of network devices to the second set of network devices.

3. The system of claim 1, wherein the operations further comprise shortening the time of the network transfer timing parameter comprising accelerating a routing of the network traffic from the first set of network devices to the second set of network devices.

4. The system of claim 1, wherein the first protocol is one of a combined transmit/receive diversity protocol, a beamforming protocol, or a spatial multiplexing protocol and the second protocol is one of the combined transmit/receive diversity protocol, the beamforming protocol, or the spatial multiplexing protocol.

5. The system of claim 1, wherein the operations further comprise:
identifying a third protocol supported by a non-multiple-input multiple-output transmission; and
changing a network transfer parameter wherein the transfer of network traffic to the second set of network devices occurs faster, as compared to a standard network transfer time parameter, in response to the first set of network devices being identified with the third protocol.

6. The system of claim 1, wherein the operations further comprise:
identifying a third protocol supported by a non-multiple-input multiple-output transmission; and
changing a network transfer parameter wherein the transfer of network traffic to the second set of network devices occurs slower, as compared to a standard network transfer time parameter, in response to the second set of network devices being identified with the third protocol.

7. The system of claim 1, wherein the first protocol and the second protocol have substantially a same multiple-input multiple-output performance, and the operations further comprise utilizing a standard network transfer time parameter to route the network traffic from the first set of network devices to the second set of network devices.

8. The system of claim 1, wherein the first set of network devices and the second set of network devices utilize a same frequency partitioning.

9. The system of claim 1, wherein the first set of network devices are macro cell enabled devices and the second set of network devices are small cell enabled devices.

10. The system of claim 1, wherein the first set of network devices are small cell enabled devices and the second set of network devices are macro cell enabled devices.

11. A method for performing a handover, comprising:
ascertaining, by a system comprising a processor, a first protocol supported by multiple-input multiple-output transmission of a set of source devices of a source network and a second protocol supported by multiple-input multiple-output transmission of a set of target devices of a target network in response to determining network traffic of a mobile device is to be routed from the set of source devices to the set of target devices;
comparing, by the system, respective multiple-input multiple-output performances of the first protocol and the second protocol, wherein the first protocol comprises a first performance level and the second protocol comprises a second performance level;
adjusting, by the system, a network transfer parameter as a function of the comparing; and
routing, by the system, the network traffic of the mobile device from the set of source devices to the set of target devices based on the adjusted network transfer parameter, wherein the network transfer parameter is a configurable transition time that pertains to network traffic being routed from the set of source devices to the set of target devices.

12. The method of claim 11, wherein the adjusting comprises shortening a time to route the network traffic of the mobile device from the set of source devices to the set of target devices as compared to a uniform handover boundary being used for the routing.

13. The method of claim 11, wherein the adjusting comprises delaying a routing of the network traffic of the mobile device from the set of source devices to the set of target devices as compared to a uniform handover boundary being used for the routing.

14. The method of claim 11, further comprising:
routing, by the system, network traffic of the mobile device from the set of source devices to the set of target devices almost instantaneously as a result of determining the first performance level for the first protocol and the second performance level for the second protocol.

15. The method of claim 11, further comprising:
retaining, by the system, network traffic of the mobile device on the set of source devices longer than a uniform handover boundary as a result of determining the first performance level for the first protocol and the second performance level for the second protocol.

16. The method of claim 11, wherein the ascertaining comprises determining the first protocol is one of a combined transmit/receive diversity protocol, a beamforming protocol, or a spatial multiplexing protocol and the second protocol is one of the combined transmit/receive diversity protocol, the beamforming protocol, or the spatial multiplexing protocol.

17. A computer-readable storage device storing computer-executable instructions that, in response to execution, cause a system comprising a processor to perform operations for performing a handover, comprising:

associating a first protocol supported by a first multiple-input multiple-output transmission with a first set of devices of a source network and a second protocol supported by a second multiple-input multiple-output transmission with a second set of devices of a target network; and adjusting a network transfer timing parameter as a function of the first protocol being determined to have a first performance level and the second protocol being determined to have a second performance level, wherein the network transfer timing parameter identifies a time pertaining to network traffic being routed from the first set of devices to the second set of devices.

18. The computer-readable storage device of claim 17, wherein the operations further comprise:

comparing the first performance level of the first protocol and the second performance level of the second protocol, wherein the adjusting is based on a difference between the first performance level of the first protocol and the second performance level of the second protocol.

19. The computer-readable storage device of claim 18, wherein the operations further comprise:

lengthening the time of the network transfer timing parameter in response to determining the first performance level for the first protocol and the second performance level for the second protocol, wherein the lengthening comprises causing the network traffic to remain on the first set of devices longer than a standard handover timing parameter would cause.

20. The computer-readable storage device of claim 18, wherein the operations further comprise:

shortening the time of the network transfer timing parameter in response to determining the first performance level for the first protocol and the second performance level for the second protocol, wherein the shortening comprises accelerating routing of the network traffic to the second set of devices as compared to standard routing of a standard handover timing parameter.

* * * * *